UNITED STATES PATENT OFFICE.

WILLIS A. GIBBONS, OF FLUSHING, NEW YORK, ASSIGNOR TO NEW YORK BELTING AND PACKING COMPANY, A CORPORATION OF NEW YORK.

PROCESS FOR VULCANIZING RUBBER AND PRODUCTS OBTAINED THEREBY.

1,291,828.     Specification of Letters Patent.     Patented Jan. 21, 1919.

No Drawing.     Application filed August 30, 1917. Serial No. 188,891.

*To all whom it may concern:*

Be it known that I, WILLIS A. GIBBONS, a citizen of the United States, residing at Flushing, L. I., county of Queens, and State of New York, have invented certain new and useful Improvements in Processes for Vulcanizing Rubber and Products Obtained Thereby, of which the following is a full, clear, and exact description.

This invention relates to processes for vulcanizing rubber or similar material such as gutta percha, balata, synthetic rubber and materials commonly classed under the term "rubber," and to the products obtained thereby. It is more particularly directed to a process in which the use of sulfur or sulfur compounds as vulcanizing ingredients may be partially or wholly eliminated; and to the products resulting therefrom.

The principal object of the present invention is to provide a simple, inexpensive and efficient process which by obviating the use of sulfur or sulfur compounds partially or entirely as the vulcanizing agent shall do away with various disadvantages experienced in the use thereof such as defects due to unavoidable excess of sulfur, and restriction of the range of colors which may be employed in conjunction therewith. Another object is to provide a series of products having improved physical characteristics including greatly heightened resistance to aging under heat and a wide range of colors employing a vulcanizing agent or agents eliminating in part or in whole sulfur and sulfur compounds.

In carrying out the process in its preferred form, 100 parts by weight of rubber are mixed with 3 parts of beta-dinitroanthraquinone and 10 parts of litharge. The mixture is placed in a mold and subjected to the pressure of a vulcanizing press, where it is heated for one hour at approximately 286° F. When removed from the press complete vulcanization is found to have taken place.

Litharge as employed in the above mixture accelerates the cure, but it has been found that vulcanization may be also satisfactorily accomplished in the absence of an accelerator. Under such circumstances, the length of time for vulcanization and the quantity of vulcanizing material are preferably increased.

In carrying out vulcanization in the absence of litharge or other accelerator, 100 parts by weight of rubber are mixed with 30 parts beta-dinitroanthraquinone and the mixture vulcanized in a mold in a vulcanizing press at a temperature of 306° F. for approximately two hours.

The rubber produced by these procedures is soft and is generally applicable where soft rubbers produced by sulfur vulcanization have been used. The product possesses high tensile strength among other desirable physical characteristics, is free from bloom, and shows marked resistance to aging, particularly under heat.

The vulcanizing agent, beta-dinitroanthraquinone, may be prepared substantially as follows:—15 parts by weight of anthracene are added to a mixture of 690 parts of nitric acid (1.38 sp. gr.) and 250 parts of water heated to 90° C. The mixture is shaken until all of the anthracene is changed to a flocculent mass and then boiled until red vapors are no longer evolved. The liquid is then poured off, the solid washed with water, and if desired, with a 5% solution of sodium carbonate. The solid is then again washed with water and dried in any approved manner. If desired, the product may be purified by recrystallization from alcohol, but is preferably employed as obtained after drying.

Anthracene is obtained from anthracene oil a product of the distillation of coal-tar, which oil comprises the following naturally occurring anthracene derivatives and substances similar to anthracene:—anthracene dihydrid, anthracene hexahydrid, methylanthracene, dimethylanthracene, fluorene, phenanthrene, pseudophenanthrene, fluoranthrene, pyrene, retene, chrysene, chrysogene, picene, acridin, acridin picrate, etc. Anthracene may be separated from these various other constituents occurring with it in anthracene oil by a well-known procedure and may be obtained in a relatively pure state.

It will be noted that other derivatives of anthracene and its related products may be employed. For example, the nitro-anthracenes and nitro-derivatives of the various constituents of anthracene oil mentioned may be used as vulcanizing agents. Further, beta-dinitroanthraquinone and similar substances may be employed in connection with another or other vulcanizing agents, for example, they may be used with sulfur. Rubber vulcanized with these two ingredients possesses desirable physical characteristics. Furthermore it has been found that many pigments and organic dyes which are ordinarily discolored or otherwise disadvantageously affected by sulfur, may be used with beta-dinitroanthraquinone and similar substances without such disadvantageous effect. Further according to the process outlined the beta-dinitroanthraquinone may be easily and cheaply made thus permitting the vulcanization to be carried on at low cost. It will also be noted that substances other than lead oxid may be used as accelerators.

No claim is made to the employment of nitro-compounds broadly as vulcanizing agents for rubber.

As many apparently widely different embodiments of this invention could be made without departing from the spirit thereof, it is to be understood that I do not intend to limit myself to the specific form of the invention as set forth except as indicated in the appended claims.

Having thus described my invention what I claim and desire to protect by Letters Patent is:—

1. A process for treating rubber or similar material which comprises subjecting the rubber to a vulcanizing agent comprising a nitro-derivative of anthracene.

2. A process for treating rubber or similar material which comprises subjecting the rubber to a vulcanizing agent comprising a nitro-compound of an anthracene derivative.

3. A process for treating rubber or similar material which comprises subjecting the rubber to a vulcanizing agent comprising a nitro-compound of anthraquinone.

4. A process for treating rubber or similar material which comprises subjecting the rubber to beta-dinitroanthraquinone.

5. As a new compound, vulcanized rubber comprising a nitro-derivative of anthracene.

6. As a new compound, vulcanized rubber comprising a nitro-compound of an anthracene derivative.

7. As a new compound, vulcanized rubber comprising a nitro-compound of anthraquinone.

Signed at London, England, this 26 day of July, 1917.

WILLIS A. GIBBONS.